(12) United States Patent
Drinkwater

(10) Patent No.: US 8,562,025 B2
(45) Date of Patent: Oct. 22, 2013

(54) SECURE DATA PROTECTION OPTICALLY VARIABLE LABELS AND FOILS

(75) Inventor: Kenneth John Drinkwater, Andover (GB)

(73) Assignee: Optaglio Limited, Swindon (GB)

( * ) Notice: Subject to any disclaimer, the term of this patent is extended or adjusted under 35 U.S.C. 154(b) by 1099 days.

(21) Appl. No.: 10/503,432

(22) PCT Filed: Feb. 5, 2003

(86) PCT No.: PCT/GB03/00479
§ 371 (c)(1),
(2), (4) Date: Jun. 27, 2005

(87) PCT Pub. No.: WO03/066344
PCT Pub. Date: Aug. 14, 2003

(65) Prior Publication Data
US 2005/0243391 A1     Nov. 3, 2005

(30) Foreign Application Priority Data
Feb. 5, 2002    (GB) .................................. 0202646.6

(51) Int. Cl.
*B42D 15/00*    (2006.01)
*B42D 15/10*    (2006.01)

(52) U.S. Cl.
USPC .................. 283/94; 283/72; 283/73; 283/95; 283/99; 283/100; 283/102; 283/107; 283/108; 283/109; 283/111; 283/901

(58) Field of Classification Search
USPC ........... 283/17, 72, 73, 79, 86, 91, 93, 94, 98, 283/99, 100, 107, 109, 111, 113, 901, 903, 283/904, 83, 90, 95, 96, 102, 108; 359/1, 359/15, 558, 577; 428/40.1, 352, 916
See application file for complete search history.

(56) References Cited

U.S. PATENT DOCUMENTS

| 4,568,141 A | 2/1986 | Antes |
| 5,034,003 A | 7/1991 | Denance |

(Continued)

FOREIGN PATENT DOCUMENTS

| DE | 38 31 583 A1 | 4/1989 |
| DE | 197 29 918 A1 | 1/1999 |

(Continued)

*Primary Examiner* — Dana Ross
*Assistant Examiner* — Justin V Lewis
(74) *Attorney, Agent, or Firm* — Kilpatrick Townsend & Stockton LLP

(57) ABSTRACT

An optical security label for security and anti-counterfeit applications comprises a first layer having an optically variable portion (diffractive, holographic or interference film) generating an optically variable effect secured to a support layer by a weak adhesive layer such that the first layer can be scratched off the third support layer to reveal underlying data and the label is affixed to a substrate by a pressure sensitive adhesive. The label or substrate carry the data to be protected such a printed or personalized paper or plastic substrate. In one aspect the scratch off region is patterned and also the data can comprise a pattern of alternate scratch off and permanent areas. In one aspect the label is a thin frangible structure delivered to the substrate with a weakly bound top carrier. In another aspect the optical variable device includes a covert image authenticated by a decoder carried on the top of the removable carrier. In one aspect the pressure sensitive adhesive is a curable adhesive to provide a permanent bond.

28 Claims, 5 Drawing Sheets

(56) References Cited

U.S. PATENT DOCUMENTS

| | | | |
|---|---|---|---|
| 5,151,318 A * | 9/1992 | Strasilla et al. | 428/42.2 |
| 5,483,363 A | 1/1996 | Holmes et al. | |
| 5,694,229 A | 12/1997 | Drinkwater et al. | |
| 5,697,649 A * | 12/1997 | Dames et al. | 283/83 |
| 5,704,647 A * | 1/1998 | Desbiens | 283/67 |
| 5,803,504 A * | 9/1998 | Deshiens et al. | 283/903 |
| 5,850,951 A * | 12/1998 | Hayes | 222/525 |
| 5,925,440 A * | 7/1999 | Farag et al. | 283/102 |
| 6,062,604 A * | 5/2000 | Taylor et al. | 283/72 |
| 6,106,932 A * | 8/2000 | Carides et al. | 428/32.85 |
| 6,157,487 A * | 12/2000 | Staub et al. | 359/567 |
| 6,443,494 B1 * | 9/2002 | Lieberman Zadjman et al. | 283/86 |
| 7,063,924 B2 * | 6/2006 | Kaminsky et al. | 283/91 |
| 2002/0105184 A1 * | 8/2002 | Murcia et al. | 283/107 |

FOREIGN PATENT DOCUMENTS

| | | |
|---|---|---|
| EP | 0 399 410 A2 | 11/1990 |
| FR | 2780339 A1 | 12/1999 |
| WO | WO 93/18419 A1 | 9/1993 |
| WO | WO 95/02200 A1 | 1/1995 |
| WO | WO 95/04948 A1 | 2/1995 |
| WO | WO 99/05903 A1 | 2/1999 |
| WO | WO 02/02351 A1 | 1/2002 |
| WO | WO 02/03109 A1 | 1/2002 |
| WO | WO 02/03323 A1 | 1/2002 |
| WO | WO03/009225 A2 | 1/2003 |
| WO | WO 03/009225 A2 | 1/2003 |
| WO | WO 02/06858 A2 | 1/2004 |

* cited by examiner

SECURE DATA PROTECTION OPTICALLY VARIABLE LABELS AND FOILS

Optically variable diffractive devices such as holograms and optical interference based devices are now used to prove the authenticity of items of value and to prevent their fraudulent duplication for example for banknotes, plastic cards, value documents such as fiscal stamps, travel documents such as passports and for the authentication of valuable goods as an anti-counterfeit measure. Scratch off inks are used to protect hidden numbers which can be revealed by scratching off the ink—for example on lottery tickets for number protection and for protecting secure validation numbers on validation cards, such as pre-pay telephone cards. Scratch off diffractive and holographic hot stamping foil is also used in this type of application with the advantage that the holographic foil is hard to replicate or obtain and therefore protects the number from alteration or prior use and re-sale.

This invention relates to an optically variable diffractive device particularly useful in the area of anti-counterfeit and authentication. In one aspect of this invention the product is a holographic scratch off label used for hidden data protection and also as a form of validation. In another aspect of this invention this label can be made tamper evident against removal and alteration. In another aspect of this invention a transparent self adhesive tamper evident transfer label is disclosed, where the structure consists of multiple layers designed to be partially removed on abrasion in a distinctive pattern (i.e. to provide additional authentication by patterned scratch off capability) as an interactive security device. In another aspect a diffractive tamper evident label is revealed where the diffractive image contains a hidden code incorporated as a dot screen image and the top removable carrier layer of the label contains the decoder overlay needed, for authentication to provide an interactive and self authenticable security label.

Devices based on the principle of optical diffraction are often used for anti-counterfeit and security purposes because they can produce, by the process of optical diffraction, an optically variable image with characteristic features such as depth and parallax (holograms) and movement features and image switches (purely diffraction grating devices and some holographic devices). Such diffractive, optically variable image forming devices are used as anti-counterfeit devices both because their effects are highly recognisable and cannot be duplicate by print technologies, and because specific and difficult to replicate optical and engineering techniques are required for their production.

These diffractive optically variable image forming devices form their effects base on holographic or pure diffraction grating techniques and are often manufactured as embossed surface relief structures as known in the art (e.g. Graham Saxby, Practical Holography Prentice Hall 1988). They are typically applied to documents of value, plastic cards and articles of value to be protected in the form of holographic or diffractive hot stamping foil or holographic or diffractive labelling, often tamper evident, the labelling being constructed usually of a plastic base or of hot stamping foil applied to a paper base using the known method from the printing industry of the technique of hot stamping of decorative foils.

These are various forms of pure diffraction grating devices in use as such security devices, examples include U.S. Pat. No. 4,568,141, which reveals a diffraction optical authenticating element and U.S. Pat. No. 5,034,003 which reveals another form of optical security device using diffraction gratings. Another form of pure diffraction grating security device can be produced by direct writing by an electron beam and examples are WO 9318419, WO 9504948 and WO 9502200. Teachings on methods of origination useful for dot screen hidden images, for example using electron beam lithography can be found in PCT/GB/2002/003257, useful teachings on methods of recording and replaying covert laser readable features using both laser interference and direct write origination can be found in WO 02/03323 A1, WO 02/02351 A1 and WO 02/03109 A1 and useful methods for originating achromatic structures can be found in WO 02/06858 A2—the teachings of all which are incorporated by reference. Diffractive optical variable image forming device can also produced by holographic methods and are known by their use in security applications for example on credit cards, secure documents and product authentication—examples of such teachings are U.S. Pat. No. 5,694,229, U.S. Pat. No. 6,483,363, WO 995903.

Currently various approaches have been used for securing data on product and documents. These include tamper evident security labelling using anti-counterfeit features such as holograms, diffractive devices, or various forms of security print to add an authentication mark to a document of value or an authentication label to the goods each mark containing a difficult to counterfeit public recognition optical security device. Examples of such optical diffractive features are known in the art and by usage and are detailed below.

It is often advantageous and known in the art to protect hidden numbers on pre-pay cards or lottery tickets by scratch off ink systems, where the ink covering the ticket or validation number can be scratched off using say a coin but keeps the number or information completely hidden until usage. Scratch off diffractive and holographic hot stamping foil is used in this type of application to protect information of value from prior disclosure or alteration—with the advantage that the holographic foil is hard to replicate or obtain and therefore protects the number from alteration or prior use and re-sale. In these applications the hot stamping device would be opaque to prevent viewing of underlying data—usually metallized with aluminium or a similar reflective and opaque metal which can be scratched off to reveal the data.

In other applications diffractive devices are applied to documents as transparent or semi transparent labels or applied as hot stamping foil or tamper evident labels over data to protect underlying data from alteration and to provide validation. One disadvantage of the use of hot stamping foil for this is a requirement for individualized stamping machines at the point of document infilling. A disadvantage of label stock used in this type of application is that they are required to be fully tamper evident and many carried labels with a plastic or similar base layer can sometimes be removed by the application of heat or solvents.

An object of this invention is to provide an improvement upon the above devices by revealing a transferred tamper evident layer where a diffractive security layer is transferred in a self adhesive form to cover data, a plastic carrier removed to leave a thin unsupported layer similar to hot stamping foil and difficult to remove, with an intermediate layer containing for example a soft material to provide a controlled scratch off pattern with a backing layer of a hard material coating. In this type of label the diffractive or holographic layer will be transparent or semi transparent to provide for viewing of the underlying data for example created by the use of transparent reflective layers such as dielectric or multi-stack interference coatings or by the use of partial demetallisation techniques as known in the art.

This new security device thus provides an improvement on the previous devices in various ways as detailed here.

According to a first aspect of the invention an optical security label mounted on a document comprises a first composite layer having an optically variable portion (diffractive, holographic or interference film) generating an optically variable effect (either a metallised surface relief hologram or a volume type reflection hologram) secured to a third support layer by a second weak adhesive layer or weak abradable layer such as a latex based scratch off coating such that the first composite layer can be abraded off the third support layer by scratching with for example a fingernail to reveal underlying data on the substrate to which the whole structure is adhered by a pressure sensitive adhesive applied a fourth layer to the opposite side of the third support layer to adhere the whole device to a substrate carrying the data to be protected such a printed or personalised paper or plastic substrate. The third support layer can be typically a polymer layer, such as PET or preferably a frangible polymer such as frangible vinyl or cellulose acetate or similar, or could be a lacquer coated frangible paper. By optically variable device the term also refers to a device exhibiting optical interference effects, such as a thin film device or a combination of a interference device and a diffractive device. Typically an optical interference device would consist of a number of layers of clear material of varying refractive index or an arrangement of a semi transparent metal layer, a transparent spacer layer and a second semi reflecting or fully reflecting metal layer arranged to provide colour shift effects by the process of optical interference—such structures are known in the art. The combination of a diffractive security device with a scratch off underlying layer provides a considerable barrier to a counterfeiter to duplicate the diffractive image after removal of the scratch off layer for examination, thus making counterfeit or unauthorized access and reuse of the data more difficult.

In preferred second aspect this label improved in tamper resistant by using an improved pressure sensitive adhesive to prevent lifting of the scratch off label, (for example with heat), to examine the data. This new label uses a two part curable adhesive system with (though not exclusively) the adhesive portion applied to the scratch off label as a conventional pressure sensitive adhesive and the catalyst to trigger the hardening and curing process (or ink containing the catalyst) printed on the application area of the substrate (or applied by other means such as a dropper for example) prior to the label application. This allows the labels to be applied at high speed as pressure sensitive labels on automated equipment using an adhesive that then cures and hardens under time as the catalyst and adhesive flow together to provide a completely permanent bond that cannot be softened by heat or easily attacked by solvents.

In a third aspect an alternative tamper evident method of protection against heat attack of the scratch off label is also envisaged by using a permanent thermochromic ink that changes colour irreversibly beyond the softening temperature of the adhesive revealing a message such as 'void' on the label or the card.

According to fourth aspect of the invention the information to be protected and revealed by scratching off the weak layer of the label is printed or formed on the label substrate itself which could be for example a polymer layer, such as PET or preferably a frangible polymer such as frangible vinyl or cellulose acetate or similar, or could be a coated frangible paper. The information can be formed either on top of the substrate (where case the substrate could be opaque or coloured to prevent visualization) or on the underside of the substrate next to the adhesive layer, in which case the substrate would be transparent and the adhesive doped to be opaque or and advantageously curable as detailed above or alternatively an additional opaque layer, such as an ink, added between the data and the adhesive. Here the information to be protected would be variable, such as a PIN number, useful to access data or information or services and optionally a second visible number and/or a control bar code or 2D bar code would also be printed on the label in an area not covered with scratch off opaque material and available to be read visually for control purposes. In a useful embodiment the control data would be further protected by encryption. This would enable one security scratch off label, to contain the PIN numbers for the data and optionally a visible control code to track the PIN data providing useful control and distribution advantages. An example of such a label is shown in FIGS. 1 & 6.

By pressure sensitive adhesive we mean adhesive that enables adhesion between device and substrate at room temperature. By the term scratch off we mean that the optical effect generating structure and its opaque usually metallisation layer can be removed by gentle abrasion with a fingernail, or hard instrument such as a scraper or coin to reveal the underlying data on the substrate that is being hidden. An optional printed or patterned layer (for more opacity) can be added between the metallisation layer and the scratch off layer to add opacity.

In a fifth aspect of the invention the support layer which could be PET can advantageously be a weaker frangible plastic carrier, such as frangible vinyl or cellulose acetate or over-lacquered lightweight paper—lightweight paper is particularly advantageous for weakness and cost with a lacquer added at the top surface to provide a hard surface for scratch off. Typical thickness would be 12, 19, 23, 36 or 50 micron. The arrangement and typical materials and dimensions are shown in FIG. 1.

According to a sixth aspect of this invention the second weak scratch off adhesive layer can be replaced by two patterned layers, one a weak scratch off adhesive layer (such as latex or rubber based scratch off ink or adhesive or a mechanically weak adhesive) designed to be scratched off, applied in a desired pattern such that upon scratching the optical variable effect generating layer only part of the optical effect generating layer is removed in a desired area whist part is rub resistant and permanent and remains in place to provide a pattern for additional verification or to leave a portion of the holographic layer remaining for subsequent authentication. In an additional aspect the patterning can contain graphical indicia or allow selected areas to be scratched off and allow some holographic areas to remain for subsequent authentication—the patterning of the areas can usefully be in the form of graphical indicia or designs. This arrangement is shown in FIG. 2.

In a seventh additional preferred aspect the patterning effect of the sixth aspect could be in to form of the PIN date to be revealed and be variable. A preferred method of achieving patterning or variable patterning for PIN date is to use a continuous scratch off coating (such as a latex adhesive/ink) and to the print onto this or onto the substrate, with for example inkjet or laser toner materials or heat activated adhesives that permeate or react with the scratch off coating under heat and pressure (as the holographic layer is laminated to the carrier substrate typically in a hot stamping operation such that the indicia areas are rendered harder and not scratchable). Suitable material for such printing would be heat activated adhesives or hardeners for the scratch off layer to locally harden the layer and render non removable such that upon scratching the diffractive layer remained in the shape of the indicia or PIN number to be revealed (or in the shape of some other desirable message such as 'VALID'. This would enable the use of clear pint materials for the PIN data field thus rendering the label more secure against number visualisation and the PIN number only revealed when the diffractive device is scratched away leaving a pattern of permanently bonded areas. This would be particularly useful for applications where a single security device such as a scratch off label carried both the data element, the diffractive device, and the PIN data fields to be protected. This form of data storage would be extremely difficult to reassemble or pass off after the data had been accessed as it guarantees that the holographic layer must be destroyed to reveal the pattern. Such a scratch off area would also be a useful stand alone security device so for example a part of as security hologram could be designed to be scratched off in a pattern for customer self authentication as an interactive security device (also perhaps revealing a message or control code) of validity whilst another are of the device would be designed to be permanent.

A useful application of the selective pattern scratch off area combined with a diffractive device on a security label would be to scratch off certain areas of the label partially to reveal an additional validation message (e.g. valid, OK) under the scratch off layer or within the residual permanently adhered layer as an additional self verifying security or interactive device. This would provide an additional form of interactive verification for the observer of the security element (for example the purchaser of an article) such that the security device provided both a visual diffractive image and a (optionally patterned) scratch off region. This technique of verification also ensures that at least part of the device was damaged in verification to prevent reuse. This technique would be useful in another aspect of this invention which provides for a patterned holographic shrink sleeve material structured according to either the first or second inventions where the substrate material is orientated PVC (poly vinyl chloride) designed to shrink in one direction on the application of heat.

In an preferred eighth aspect of this invention the concept of controlled pattern scratch off is extended to where the data is recorded as variations the hardness of the scratch off layer as in aspect three is extended to scratch off hot stamping foil when the holographic material is affixed to the substrate by hot stamping. In this aspect a standard scratch off hot stamping foil would be encoded with the data fields (or non variable or batch data) by imprinting the scratch off adhesive with additional adhesive or hardeners such that the scratch off coating becomes more robust in certain areas. So the PIN data would be revealed by scratching away the diffractive device and scratch off coating with the areas containing the data being harder than the surrounding areas so remaining permanent after abrasion. This would be an improved method both of concealing the number against access and also of making any attempt to reveal and access the number obvious and difficult to reproduce for a counterfeiter. A good method of doing this would be to apply the numbers by inkjet print or similar using an ink to absorb into the scratch off adhesive and to harden either using a hardener, hardening lacquer or a conventional heat activated adhesive to harden the scratch off layer after stamping. In a preferred mode such an ink could be substantially colourless and impossible to visualise from the holographic side after stamping but visible before stamping from the adhesive side of the foil. In another preferred embodiment of this device a control code could be printed onto an adjacent stripe of hot stamping foil uncoated with scratch off adhesive using a heat reactivatable ink (heat activated adhesive as for the number printing) such that the only the inked areas would be stamped down so providing a control code next to the scratch off coded hologram stamped down. In a useful embodiment the ink would consist of a heat activated adhesive or polymer applied by a inkjet printing or a laser toner applied by a laser printer.

According to another ninth aspect of this invention the optical security label is improved in tamper evidence by forming a fragile thin transfer layer which is transferred to the substrate which cannot be removed or replaced. This aspect of the invention consists of the structures of the previous inventions with the carrier layer of the earlier inventions (alluded to as being PET or frangible plastics previously) replaced by a thin hard coating, typically 3-10 micron thick or a very thin frangible plastic. This provides a self adhesive transfer layer thin enough to prevent removal and alteration of the data as the optical structures are essentially very weakly supported. This is a device as per any of the previous claims 1, 2, 3.

A tenth aspect of the invention provides for a manufacturing method for simple scratch off labels as above by taking embossed metallized hot stamping foil, then coating the exposed metallised side with a thin sealing lacquer layer to protect it, then coating the opposite side of the structure (normally the PET Polyethylene teraphthalate) carrier with a pressure sensitive adhesive to provide the label carrier (eg an acrylic PSA) laminated onto (for example) a silicone release paper and die cutting to provide label stock. Ideally the adhesive would be coloured to increase opacity. Optionally the PIN number could be printed (eg inkjet) on the PET side to provide a scratch off label with an integral number. Optionally an additional coating on the PET side under the number could be used to increase opacity. Optionally an adjacent are of the release able scratch off foil could be removed by application to for example and adhesive coated roller to allow a clear stripe on the label into which a control number or bar code could also be printed. In this case the release wax of the hot stamping foil is selected to allow the embossed layer to be scratched off the carrier which provides support layer.

According to an eleventh aspect of the invention there is provided for a manufacturing method for creating scratch off labels by taking embossed metallised hot stamping foil, then coating the exposed metallised side with a suitable weak adhesive layer and any other print or pattern layers as required, this adhesive being chosen to act as the scratch off layer, then transferring the hot stamping foil by a flat stamping or hot lamination process to another carrier (often PET or a frangible plastic or weak lacquered paper or alternatively a heat shrinkable PVC to provide a scratch off holographic shrink sleeve) to provide the label carrier, then coating the carrier with a pressure sensitive or curable adhesive (eg an acrylic PSA) on (for example) a silicone release paper and die cutting to provide label stock. Other variations on this method are as above.

In a preferred twelfth of the invention there is provided a composite tamper evident or scratch off label structure that allows both the carriage and delivery as a self adhesive label structure and transfer of a thin composite frangible self adhesive thin transfer layer which is applied to the substrate and cannot be removed or replaced, delivered as a composite label with a with a weakly bonded carrier layer that is easily detached and removed leaving a very thin frangible transfer coating as the label. This is provided by providing above the optical effect generating structure a weakly bonded layer (typically a wax release layer) and a thicker carrier layer, typically PET or similar. The carrier layer enables the transfer of the structure of aspect three of this invention onto the article and then the removal of the carrier layer to provide a thin transferred structure as per the third aspect of this invention. A useful aspect of this is when the carrier is weakly bonded to the underlying layers but is removed during authentication or access of the PIN data (the carrier could for example carry an additional printed message or data) after which the underlying opaque scratch off layer is abraded away to reveal the PIN data. So t aspect of this invention is an optical security label carrying a diffractive or holographic optically variable image comprising a carrier, layer typically PET, a wax release layer or weak adhesive layer to enable easy release allow easy removal of the carrier when cold (strength of bond less than grab of pressure sensitive adhesive or usefully two part curable adhesive as above so upon application to document label delaminates at this point to allow carrier removal), then a first composite layer having an optically variable portion (diffractive, holographic or interference film) generating an optically variable effect (either a metallised surface relief hologram or a volume type reflection hologram) secured to a third support layer (in this case the support layer is a thin harder coating optionally cured, typically 6-12 gsm such as a chemical or UV radiation cured hard support layer a few microns thick) by a second weak adhesive layer such that the first composite layer can be abraded off the third support coating layer by scratching to reveal underlying data carried within the label structure or on the substrate to which the whole structure is adhered by a pressure sensitive adhesive applied a fourth layer to the opposite side of the third support layer to adhere the whole device to a substrate such as paper or plastic. An example of this arrangement and operation is shown in FIG. 3.

Another thirteenth aspect of this carrier release structure is as above with the additional feature that the transferred structure now follows a construction similar to aspects 6, 7 and 8 of this invention where the scratch off weak layer is a patterned layer such that upon scratch off the hologram layer scratches off selectively leaving either a selective solid holographic layer left for future verification or a reveal authentication pattern in the scratch off layer for additional validation. The authentication pattern revealed could usefully be either additional fixed verification data providing an additional self verification or indeed the PIN number to be protected optionally formed by applying an additional print to the scratch off adhesive to alter its properties in certain areas.

A fourteenth aspect is used the patterning concept of the fully metallised opaque reflective layer used with the optically variable effect generating structure (for example a diffractive structure) is replaced by a transparent or semi transparent partially demetallised metal layer or a dielectric layer (such as Zinc Sulphide, titanium dioxide or similar) such that the transfer label now forms a data protection labels with an additional verification function that a part a pattern can be selectively scratched off to reveal an additional identification message as a self verification feature. A useful embodiment is where the self adhesive layer used is curable as above.

A useful variant on claim fourteen as aspect fifteen is where the transferred label does not necessarily contain a scratch off zone but is semi transparent and affixed over information as a data protection overlay. Advantageous this label could use the second aspect of the invention where the transferred self adhesive label contains the pressure sensitive portion of a curable adhesive and the paper or document has been treated with an ink or containing the catalyst portion of this adhesive such that the adhesive gradually cures as the layers diffuse and hardens after application to increase the bond strength and provide heat resistance. This aspect can advantageously be applied to tamper evident labels of a wide variety.

Another aspect sixteen of this invention is where the structure of aspect 12, 13, 14 where one area of the structure is made less well bonded to facilitate carrier removal. One method is where the scratch off and support the layers are stripe or spot coated (optionally in register to the holographic image) in an area smaller than the die cutting size of the final label to leave a tab uncoated by adhesive and ideally some of the other layers for ease of removal of carrier from label as shown in FIG. 4. An alternate useful method for achieving a less bound area of top carrier to ease removal would be to print or stripe a silicon release layer between the support layer an first layer to encourage release of the top carrier in one localised region as shown in FIG. 5. This method could also usefully be applied to a label with these release characteristics but without the scratch off region for use as a security label or tamper evident authentication label. In these applications the label could usefully be semi transparent and coated with a transparent reflector such as zinc sulphide or partially demetallised as detailed above.

A particularly useful seventeenth aspect of this invention widely applicable to for tamper evident labels and relevant to tamper evident labels structures with a loosely bound top carrier structure as detailed here is when the carrier of the transfer or tamper evident structure carries an additional message, particularly a decoder for a dot or line screen hidden image within the diffractive structure or perhaps located elsewhere on a document or article to be authenticated. Typically this would be formed on the top surface by conventional print techniques such as flexo, litho or gravure print and used as a decoder when the top carrier is removed from the base of the diffractive tamper evident structure. This aspect can be used to form an additional useful form of self-verifying interactive security label as detailed below.

Another particularly useful part of aspect seventeen is where the hologram contains a basic diffractive microstructure is ordered with a secondary pattern on the 25 micron to 240 micron scale (in one relevant direction, so beneath easy visual discernment) which appears to be uniform such as a pattern of pixels, dots or lines. However, the positions and/or sizes of individual elements are subtly moved from a regular array position and/or size by a small imperceptible and visually undetectable amount. This additional patterning is designed to be undetectable to the eye under close examination. However, the patterning is designed to be easily decoded by revaluing with a matched film overlay reader containing a matched but regular pattern of the same periodicity (pitch of regular array) as the encoded distorted pattern. When overlaid and viewed in cooperation with the decoder film the encoded holographic patterns and the decoder cooperate (produce an effect together when viewed) to generate a moiré style fringe or interference pattern revealing the elements of the encoded structure displaced from the normal period spacing—the displaced elements and the hidden code therein can then be seen clearly by an observer as an interruption and displacement within the moiré fringes. This pattern relies upon the spatial frequency (or distance periodicity) of the microscopic pattern within the diffractive structure and the spatial; frequency (dot or line periodicity) of the dot or line pattern in the decoder being the same or closely matched. Usually the contrast of the decoded image will be optimised by using a reverse or contrast enhancing film decoder.

A useful aspect eighteen relating to aspect seventeen, is a useful though not limiting, form of diffractive structure for aspect seventeen where the diffractive structure forms a diffusing or an achromatic diffractive effect. An especially useful device is where the achromatic structure contains a second covert laser viewable image visualized out of the image plane of the device to form an additional covert message readable using a laser based decoder. This adds a useful additional security element to the diffractive image both for a secure covert verification and also for increased resistance to counterfeit. Useful teachings on examples of methods that could be used for originating dot screen hidden images, for example using electron beam lithography and on methods of recording and replaying covert laser readable features using both laser interference and direct write origination and for recording achromatic structures can be found above—the teachings of all which are incorporated by reference. Another useful method relevant for this process is where the encoded dot screen structure is formed as part of a demetallisation pattern for example when the label is used as part of a data protection overlay.

In one useful aspect nineteen relating to aspect seventeen such a code (dot screen encoded covert feature in diffractive or diffusing image and printed decoder on removable carrier) could be incorporated into standard total release tamper evident labels (with or without demetallisation) or tamper evident labels designed with a support layer under the microstructure to enable the label to survive or scratch off labels as an additional self authenticating or interactive feature.

A particularly useful part of aspect seventeen is where the matched dot decoder pattern or overlay containing a matched but regular pattern is incorporated within the label structure itself as a top print on the removal carrier layer. So for example a holographic element containing visually apparent diffractive structures and also a hidden dot screen code together with its matched decoder can be delivered as a single composite label device for use by the end consumer or verifier forming a device with multi layers of verification—visual layer carried by the effects in the diffractive image and an additional self verifying feature where the consumer has both encoded image and decoder delivered within a single structure and can remove the top carrier layer and use for interactive verification. So for example such a structure could be used for a scratch off label, also for a label structured as above but containing no scratch off element and used as a data protection or authentication label showing tamper evident where upon disruption the top carrier can be removed and in this case used additionally to verify the underlying screen encoded structures using the decoder screen printed or formed on all or part of the top structure. In these arrangements the dot screen or line screen decoder would be printed on the top layer of the carrier structure by conventional print appearing as a light toning over all or part an area of the device. Upon removal of the top layer of the device by a consumer the carrier layer could be reversed and laid over the encoded areas of the hologram or demetallised pattern to visualize the dot screen encoded images hidden therein by a moiré effect. Hidden Images using offset or split line hidden codes verified by line screen overlays am also possible. The top layer could also contain several different types of dot or line decoders for separate elements—for example for the hologram, for demetallisation on the hologram, and also decoders linked into for a printed part of the document to verify the document it was delivered on. This can form a very useful for m of delivery of decoders for self authenticating security devices to enable the consumer to have the verification device delivered to them. As such dot screen encoded images are particularly difficult to reproduce this adds significantly to the security of the device and makes both authentication easier and counterfeit more difficult. When overlaid and viewed in cooperation with the decoder film the two patterns cooperate to generate a moiré fringe pattern—the displaced elements and the hidden code therein can then be seen clearly by an observer as an interruption and displacement within the moiré fringes.

Another aspect of this invention is an manufacturing method for aspects 12 and onwards of this invention where there is provided for a manufacturing method for creating the devices by taking embossed metallized hot stamping foil as known in the art, then coating the exposed metallized side with a scratch off layer (such as a scratch off ink or rubber based soft adhesive) or a weak heat activated adhesive layer potentially patterned as above), then optionally coating down a harder support layer, typically curable, typically radiation Ultra violet radiation curable), to form the support layer then coating the support layer with a pressure sensitive or curable adhesive to provide the label PS carrier (e.g. an acrylic PSA) on (for example) a providing a silicone release paper, then die cut to provide label stock. Optionally adhesive and layers can be spot coated or stripe coated and die cutting can be over size to provide label tag or an intermediate coating of release layer can be used to provide an easy release portion.

Another useful aspect of this invention provides in any of the above aspects for any of the layers to be doped with a material to fluoresce under UV light or luminesce under Infra Red light provide for a non visible material that can provide an additional excited detectable feature which optionally could be patterned (e.g. printed) to additionally provide a message or a machine readable message (such as a magnetic coating) for additional authentication.

By the term diffractive surface relief structure we mean an embossed holographic or diffractive structure as known in the art where the surface relief pattern is embossed into a substrate or embossing lacquer typically to form a label, hot foil or other form of diffractive device. Usually such surface relief structures are vacuum coated wilt a metal such as aluminium to provide an efficient reflector an to enhance the effect, but within the scope of this invention we anticipate r the use of different metals or coloured for example copper, chromium of different reflectivity. Copper provides an attractive alternative to provide a coloured holographic scratch off layer. Also such devices can be partially demetallised to provide partial transmission and reflection and devices substantially transparent coated with for example inorganic layer such as zinc sulphide or similar for use as data protection overlays for example.

In this invention we refer to diffractive and metallised optical structures as being the preferred optical security device but also wish to extend this description and the scope of this invention to cover alternative forms of optical security devices operating on the known principles of optical thin film interference effects consisting of either a stack of dielectric layers or a combination of metal layers and dielectric spacer layers or optical security devices depending on the volume principles of reflection holography such as dichromated gelatin and photopolymer type devices). By the term diffractive structure we refer to the surface relief structure of this device which generates its diffracted image by a process of diffraction of light and is typically manufactured by a holographic or direct write process as known in the art.

This invention will now be illustrated with the help of schematic drawings to explain preferred embodiments and potential manufacturing methods.

Figure 3:
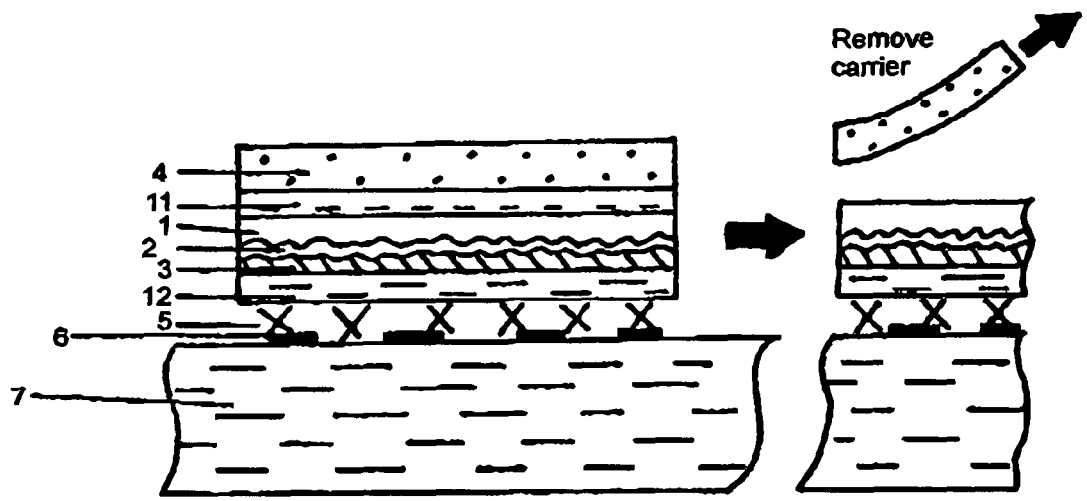
FIG. 3 illustrates a transfer carried tamper evident scratch off label structure where as thin frangible structure is transferred onto the substrate and the carrier is weakly bound and can be removed.
Figure 6:
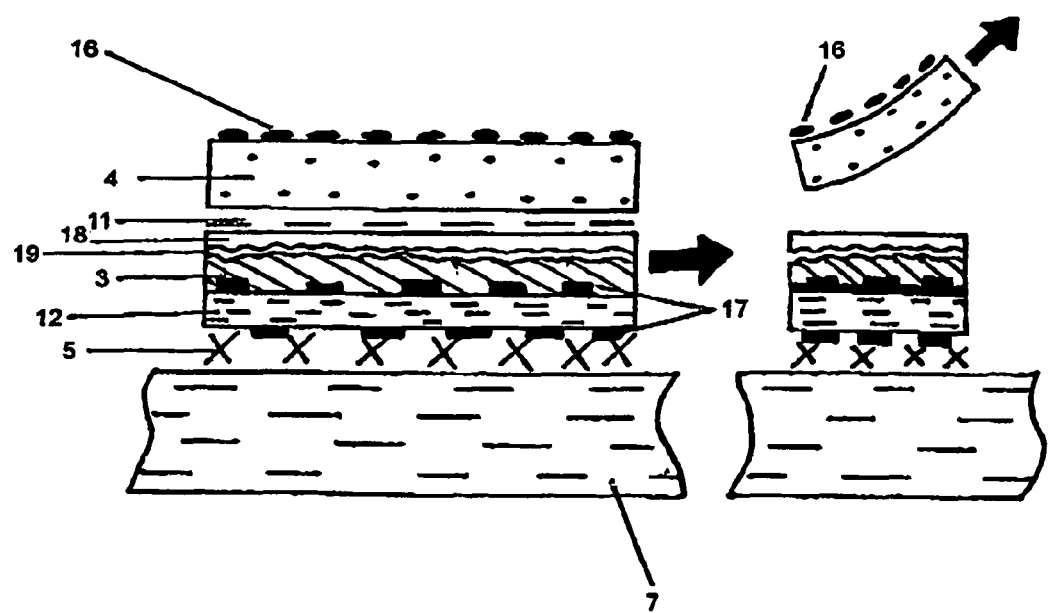
Figure 7A:
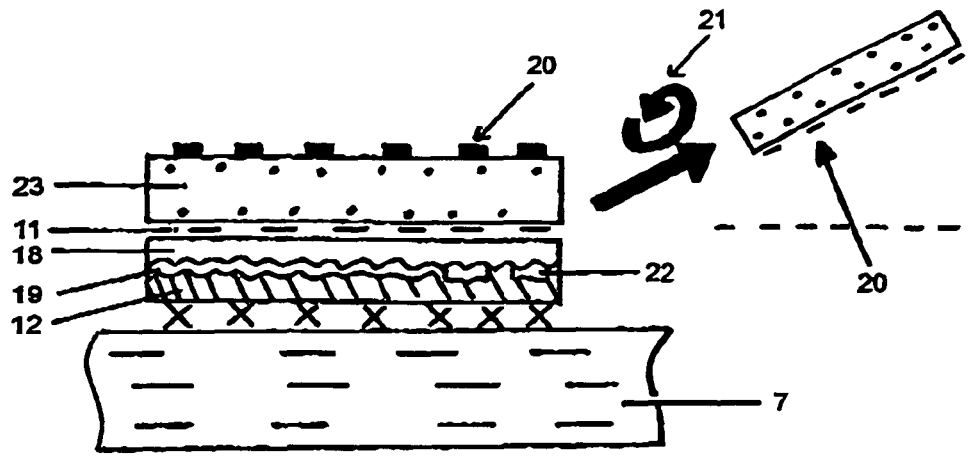

FIG. 6 illustrates the constructions of FIG. 3,4,5 but in this case with the addition of a printed decoder 16 region on the top carrier 4 to form a self authenticating label, FIG. 7 shows the printed decoder device in an alternative security labeling embodiment as an authentication device or data protection overlay label and also shows methods of authenticating this by removal and use of carrier and alternative hidden image encoding methods, all where the matched dot decoder pattern or overlay containing a matched regular pattern is delivered as a top print on the removable carrier of a tamper evident label.

Figure 1:
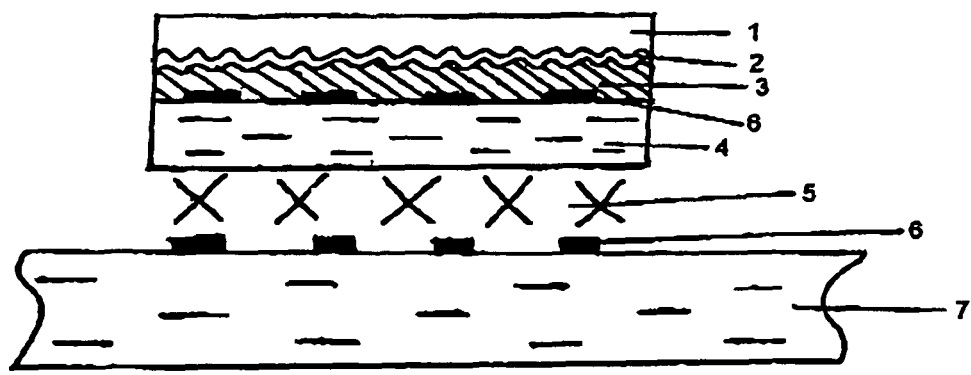
FIG. 1 illustrates the scratch off label structure.

FIG. 1 illustrates the carried scratch off label structure consisting of an optical variable effect generating structure Layer 1 such as a hologram or diffractive or interference structure, a layer of metallisation to provide reflectivity (2) such as aluminium although other metals may be used provide different effects, a weak scratch off adhesive layer (3) designed to allow layers 1 & 2 to be easily abraded away. The scratch off adhesive would typically be a latex based adhesive or ink and of high opacity to help conceal underlying data. Layer 4 is the carrier layer such as a frangible material such as frangible acetate or vinyl or a conventional carrier such as OPP or PET—typically 19-50 um. Layer 5 is a pressure sensitive adhesive and in some preferred options a curable adhesive where the curing action is triggered by applying the adhesive coated layer to a substrate pre-printed with catalyst. Layer 6 are the data or indicia to be protected in this case located on the base substrate to which the label is affixed, in a preferred embodiment the data carrying layer could be located between layers 3 & 4 or between layers 4 & 5 to provide useful configurations where the scratch off label itself also carries the PIN or similar data to be protected.

Figure 2:
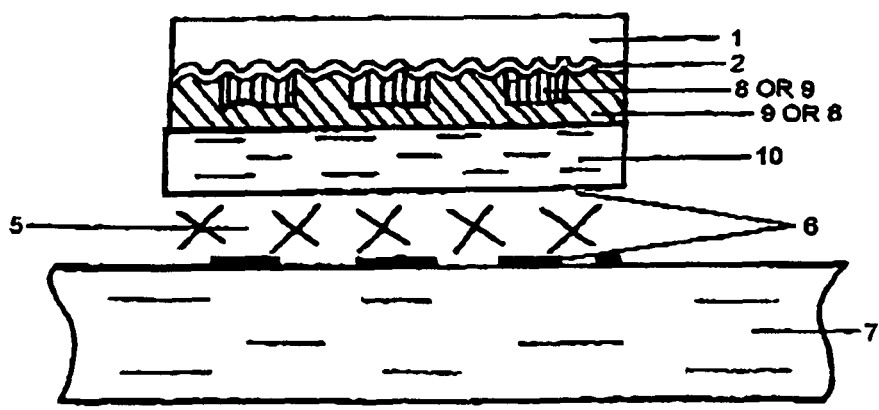
FIG. 2 illustrates the scratch off label structure with a patterned scratch off.

FIG. 2 illustrates the carried scratch off label structure with a patterned scratch off region Layer 1 is an embossing lacquer carrying an embossed surface relief hologram or diffractive structure, layer 2 is a metallisation layer to provide reflectivity both to visualize the diffractive device and provide opacity, layer 8 is a layer of scratch off adhesive which can be abraded away to reveal the data—this can be applied in a pattern as shown. Layer 9 is a more durable layer such as a more durable hot melt adhesive that remains when the soft material of layer 8 is abraded away—it should be appreciated that the order of layers 8 and 9 can be reversed for this illustration and that the harder areas of layer 9 can be created by application of a hardener or adhesive to the scratch which interacts with layer 8 to change its properties and that both layers 8 and 9 can be discontinuous. Layer 10 is a carrier or substrate such as frangible tamper evident material or a harder material such as PET. Layer 5 is a pressure sensitive adhesive for adhesion to the substrate 10. Layer 6 is the data or PIN indicia to be protected and revealed when layers 1,2 and 8 are abraded away and it should be noted that the indicia on layer 6 can occupy alternative positions such above layer 10 or between layers 10 and 5 such that the label itself carries the PIN data also. Layer 7 is the substrate carrying the structure such as a phonecard or document.

FIG. 3 illustrates a transfer carried tamper evident scratch off label structure where the structure is cold transferred off a carrier. Layer 4 shows the carrier layer such as PET or PE of typically 19 to 50 um which is relatively weakly bound by a release layer 11 to the underlying embossing lacquer 1 and reflector layer 2 (typically aluminium) which carry the diffractive optical device as usually an embossed pattern. In use the top carrier layer is removed easily to reveal the underlying thin unsupported transfer structure which is then more resistant to tamper removal to reveal the underlying number. A layer 3 consists of relatively soft scratch off adhesive or ink. Optionally a layer 12 is added as a hard layer to provide a hard surface to scratch off against which on either could also contain the hidden PIN number data* to be stored and protected. Layer 5 contains a pressure sensitive adhesive adhering the construction to the document or carrier optionally carrying the PIN number data. In alternative arrangements the layer 12 can be omitted and the layer 5 can consist of a pressure sensitive adhesive on the label brought into contact with a printed catalyst on the substrate to trigger a curing process in the adhesive to achieve a high bond strength and high temperature resistance, in another embodiment a permanent thermochromic material could be incorporated into one of the layer to evidence tamper and removal by elevated temperatures. This would be particularly appropriate in alternative arrangements where part of the reflector layer 2 was discontinuous or demetallised in an area to reveal the underlying colour of the scratch off adhesive, perhaps doped with a permanent thermochromic ink, or a printed pattern added between layers that underwent a colour change on heating. In certain configurations the scratch off adhesive can be patterned to provide a pattern when scratched off by addition of other adhesive layers or addition of hardeners as in FIG. 5 layer 20 and in preferred embodiments for security labeling the PIN data is omitted and part of the transfer label is made with a permanent adhesive and part with a patterned scratch off area to provide an additional self verifiable security feature in an authentication label as shown in FIG. 5.

Figure 4:
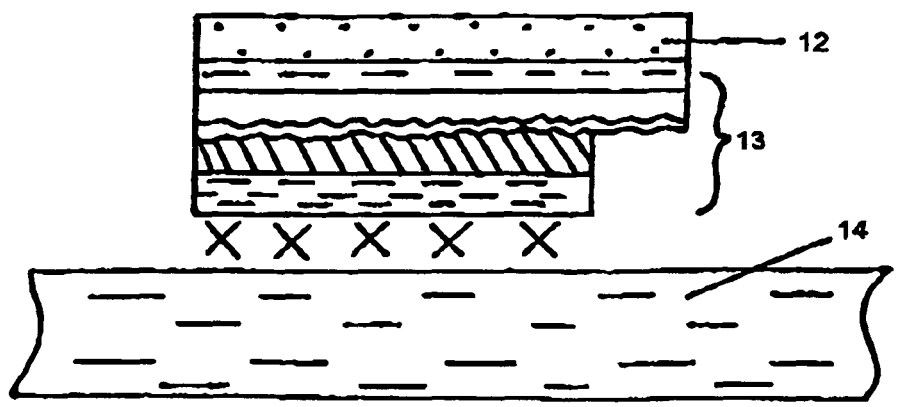
FIG. 4 illustrates a transfer carried tamper evident scratch off label structure where the structure is cold transferred off a carrier showing the construction on the release paper and the formation of a non adhesive coated tab to facilitate ease of transfer.

FIG. 4 illustrates a transfer carried tamper evident scratch off label structure where the structure is cold transferred off a carrier showing the construction on the release paper 12 and the formation of a non adhesive coated tab 13 to facilitate ease of transfer. The tab would be created by stripe/spot coating of lacquer and adhesive to a size less than the end die cut size. The spot/stripe coating creates an optional tab to facilitate easier removal of carrier when label adhered to substrate 14.

Figure 5:
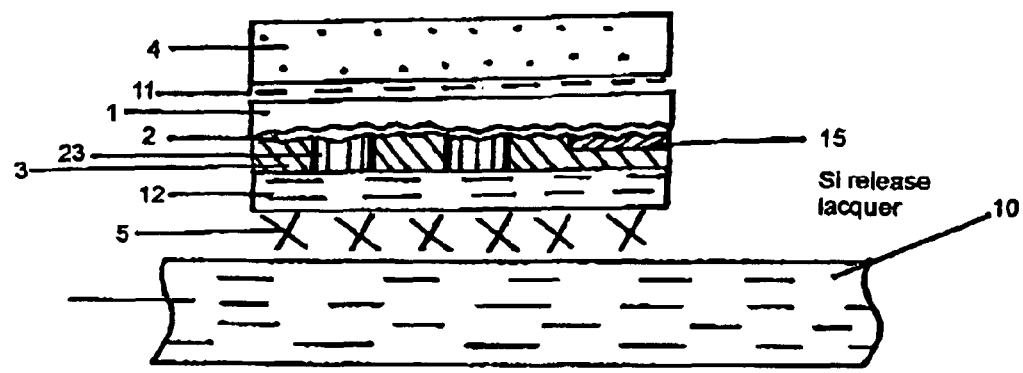
FIG. 5 illustrates another transfer carried tamper evident scratch off label structure where the structure is cold transferred off a carrier showing the printing by spot or stripe coating of a line of silicon release lacquer 15 or similar low surface energy material to create an area of the carrier 11 with easy release properties to facilitate removal.

FIG. 5 illustrates another transfer carried tamper evident scratch off label structure where the structure is cold transferred off a carrier showing the construction on the release paper 12 and in this case the printing by spot or stripe coating of a line of silicon release lacquer 15 or similar low surface energy material to create an area of the carrier 11 with easy release properties to facilitate removal of carrier. In this example the scratch off layer has also optionally been printed in discrete areas 3 interspersed with hardener or harder areas designed to be permanent 23 as in FIG. 2 to form a patterned scratch off. In one form the scratch off layer 3 is not used at all and carrier layer 12 (which could be the same material as layer 23) forms a support layer for a tamper evident label. Such a structure could usefully be combined with a transparent reflector formed by demetallisation or a high refractive index compound.

FIG. 6 illustrates the constructions of FIG. 3,4,5 but in this case with the addition of a printed decoder 16 region on the top carrier 4 as discussed above. The decoder pattern would be matched to a dot or line screen pattern recorded within the holographic image when the two are placed together a hidden image is revealed by moiré interference effects. So in use a customer could authenticate the device both by the visual diffractive effects and also by removing the carrier, reversing and visualizing the hidden dot encoded image. Thus a single tamper evident label structure delivers both the security label and its reader for the verification of the covert image in one shot as a self authenticating device. This removal of the carrier would also evidence whether the structure had been removed for authentication. FIG. 6 also shows at 17 two alternative positions of the PIN number where they can be carried on the label.

Figure 7B:
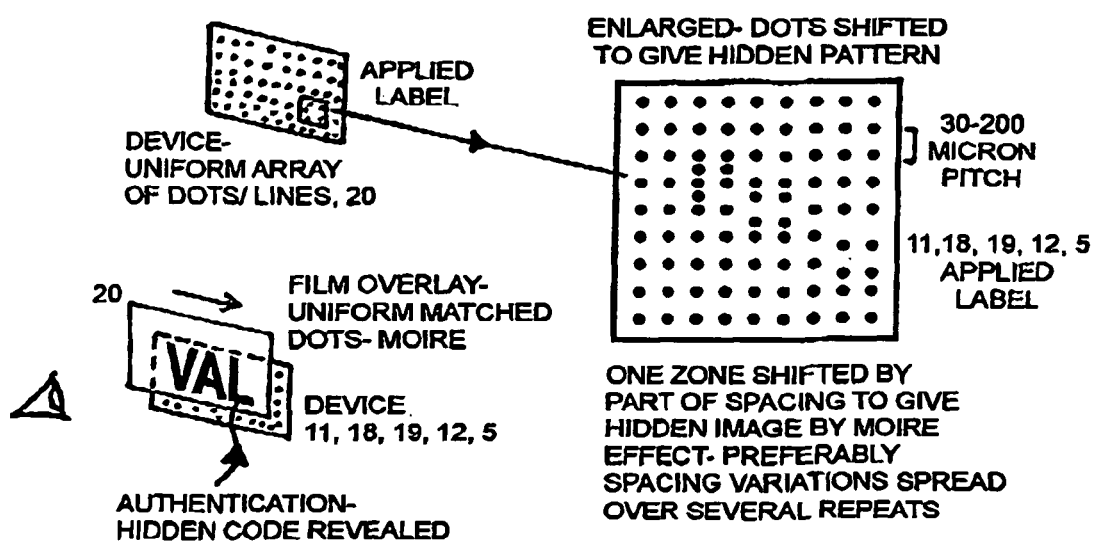
Figure 7C:
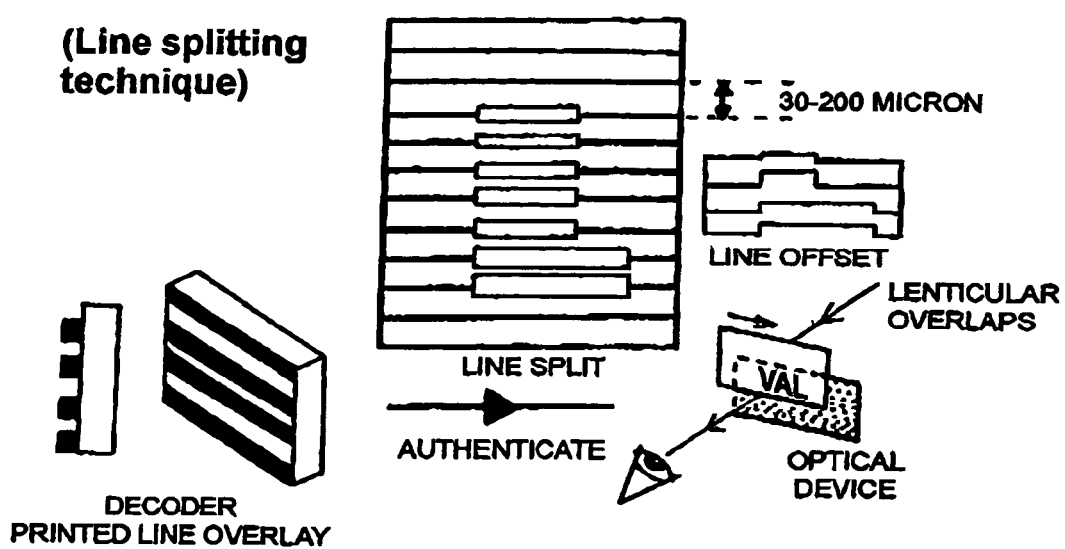

FIG. 7 shows the printed decoder device of FIG. 6 in an alternative security labeling embodiment as an authentication device or data protection overlay label where the matched dot decoder pattern or overlay containing a matched regular pattern is delivered as a top print 20 on the removed carrier layer 23. So for example a holographic element containing visually apparent diffractive structure 18,19 and also a hidden dot screen code within the diffractive image together with its matched decoder 20 can be delivered as a single composite label device for use by the end consumer. Such a structure could be used as a data protection or authentication label showing tamper evident where upon disruption the top carrier can be removed 21 and used additionally to verify the underlying screen encoded structures as shown in FIG. 7B and 7C using the decoder screen printed or formed on all or part of the top structure 20. In these arrangements the dot screen or line screen decoder 20 would be printed on the top layer of the carrier structure 23 by conventional print appearing as a light toning over an area of the device. Upon removal of the top layer 23 of the device by a consumer the carrier layer could be reversed 21 and laid over the encoded areas of the hologram or demetallised pattern FIGS. 7B and 7C to visualize the dot screen encoded images hidden therein by a moiré effect. Images using offset or slit line hidden codes verified by line screen overlays are also possible as in FIG. 7C.

The invention claimed is:

1. A security device comprising a layered structure comprising:
   a first layer having a first location and a second location, wherein the first layer carries indicia at the second location, wherein the indicia comprises covert information that is not visible to human viewing;
   a weak adhesive layer provided on the first layer;
   a second layer carrying decoding optical elements, wherein the second layer is coupled to the first layer by the adhesive layer over the first location on the first layer, wherein the second layer is configured to be peeled off from the first layer while the optical elements remain intact and to be placed onto the first layer over the second location, wherein, in the second location, the optical elements serve to cooperate with the indicia so as to make the covert information visible to human viewing.

2. A device as claimed in claim 1, and including an optically variable effect generating structure.

3. A device as claimed in claim 2, wherein the optically variable effect generating structure comprises at least one of a diffractive and an interference optical device arranged to provide a visually authenticable image.

4. A device as claimed in claim 2, wherein the said covert information is provided within the optically variable effect generating structure.

5. A device as claimed in claim 4, wherein the optically variable effect generating structure containing the convert information generates an achromatic effect and also generates a covert laser verifiable image.

6. A device as claimed in claim 4, wherein the optically variable effect generating structure containing the covert information comprises a diffusing structure.

7. A device as claimed in claim 1, wherein the said indicia are encoded within variations in a periodic array structure and the decoding optical elements comprise a periodic array structure.

8. A device as claimed in claim 7, wherein the said encoded indicia are non-visible.

9. A device as claimed in claim 7, wherein the said periodic array structure comprises an array of dots.

10. A device as claimed in claim 7, wherein the said periodic array structure comprises an array of lines.

11. A device as claimed in claim 1, wherein the said indicia is defined by a demetalization pattern.

12. A device as claimed in claim 2, wherein the said demetalization pattern is provided within a reflective layer of the optically variable effect generating structure.

13. A device as claimed in claim 1, and comprising a hot stamping foil.

14. A security device comprising a layered structure comprising:
   a substrate;
   a first layer disposed on the substrate, the first layer having a first location and a second location, wherein the first layer carries indicia at the second location, wherein the indicia comprises covert information that is not visible to human viewing;
   a weak adhesive layer provided on the first layer;
   a second layer carrying decoding optical elements, wherein the second layer is coupled to the first layer by the adhesive layer over the first location on the first layer, wherein the second layer is configured to be peeled off from the first layer while the optical elements remain intact and to be placed onto the first layer over the second location, wherein, in the second location, the optical elements serve to cooperate with the indicia so as to make the covert information visible to human viewing.

15. A device as claimed in claim 14, including an optically variable effect generating structure.

16. A device as claimed in claim 15, wherein the optically variable effect generating structure comprises at least one of a diffractive and an interference optical device arranged to provide a visually authenticable image.

17. A device as claimed in claim 15, wherein the said covert information is provided with in the optically variable effect generating structure.

18. A device as claimed in claim 17, wherein the optically variable effect generating structure containing the covert information generates an achromatic effect and also generates a covert laser verifiable image.

19. A device as claimed in claim 17, wherein the optically variable effect generating structure containing the covert information comprises a diffusing structure.

20. A device as claimed in claim 14, wherein the said indicia are encoded within variations in a periodic array structure and the decoding optical elements comprise a periodic array structure.

21. A device as claimed in claim 20, wherein the said encoded indicia are non-visible.

22. A device as claimed in claim 20, wherein the said periodic array structure comprises an array of dots.

23. A device as claimed in claim 20, wherein the said periodic array structure comprises an array of lines.

24. A device as claimed in claimed 14, wherein the said indicia is defined by a demetalization pattern.

25. A device as claimed in claim 15, wherein the said demetalization pattern is provided within a reflective layer of the optically variable effect generating structure.

26. A device as claimed in claim 16, and including a carrier form of coated frangible paper.

27. A device as claimed in claim 14, and comprising a hot stamping foil.

28. A device as claimed in claim 16, and including a carrier formed of coated frangible paper.

* * * * *